United States Patent
Barlow

(10) Patent No.: US 7,882,653 B2
(45) Date of Patent: Feb. 8, 2011

(54) MOBILE BILLBOARD ADVERTISING SYSTEM AND APPARATUSES

(75) Inventor: Eslee Buckley Barlow, Salt Lake City, UT (US)

(73) Assignee: Frog Marketing, Inc., West Jordan, UT (US)

( * ) Notice: Subject to any disclaimer, the term of this patent is extended or adjusted under 35 U.S.C. 154(b) by 1314 days.

(21) Appl. No.: 11/142,178

(22) Filed: May 31, 2005

(65) Prior Publication Data

US 2006/0271428 A1 Nov. 30, 2006
US 2010/0036739 A2 Feb. 11, 2010

(51) Int. Cl.
G09F 15/00 (2006.01)
G09F 15/02 (2006.01)
G09F 19/00 (2006.01)
G09F 7/00 (2006.01)
G09F 21/04 (2006.01)

(52) U.S. Cl. .................. 40/606.15; 40/601; 40/643; 40/531

(58) Field of Classification Search .......... 40/531, 40/601, 606.15, 643
See application file for complete search history.

(56) References Cited

U.S. PATENT DOCUMENTS

| | | | | |
|---|---|---|---|---|
| 2,077,585 A * | 4/1937 | Rivers | ................... | 40/592 |
| 3,802,103 A * | 4/1974 | Neff | ................... | 40/591 |
| 4,346,529 A * | 8/1982 | Keller | ................... | 40/588 |
| 5,255,464 A | 10/1993 | Marecek | | |
| 5,603,178 A | 2/1997 | Morrison | | |
| 5,878,516 A | 3/1999 | Amirian | | |
| 5,974,711 A | 11/1999 | Tipke | | |
| 6,247,257 B1 | 6/2001 | Powell | | |
| 6,412,202 B1 | 7/2002 | Oswood | | |
| 6,418,650 B1 | 7/2002 | Krewald | | |
| 6,463,686 B1 | 10/2002 | Eisenbraun | | |
| 6,484,427 B1 | 11/2002 | Santa Cruz et al. | | |
| 6,643,963 B2 * | 11/2003 | Beller | ................... | 40/590 |
| 6,702,351 B2 | 3/2004 | Buring et al. | | |
| 6,734,792 B1 | 5/2004 | McElveen | | |
| 6,789,833 B1 * | 9/2004 | Alber | ................... | 296/57.1 |
| 6,918,200 B2 | 7/2005 | Pena | | |
| 7,154,383 B2 * | 12/2006 | Berquist | ................... | 340/425.5 |
| 7,171,773 B2 | 2/2007 | Haggard | | |
| 7,347,017 B2 | 3/2008 | Shaffer | | |
| 7,774,966 B2 * | 8/2010 | Rosa | ................... | 40/590 |
| 2002/0111146 A1 * | 8/2002 | Fridman et al. | ................... | 455/99 |

(Continued)

FOREIGN PATENT DOCUMENTS

EP 0537882 A1 * 4/1993

(Continued)

*Primary Examiner*—James W Myhre
(74) *Attorney, Agent, or Firm*—Bateman IP Law Group

(57) ABSTRACT

A novel method at least includes: receiving at least one placement offer for the placement of an advertisement, the offer including proposed consideration; accepting an placement order; and displaying an advertisement which is the subject of an accepted placement order on a plurality of mobile, changeable advertising message displays carried by a plurality of coordinated automobiles, which changeable displays are capable of displaying more than one separate message at different times. Each changeable message display at least includes: a visual display; a multiple advertising message generator coupled to the visual display, the multiple message generator adapted to generate a plurality of different messages; and an message selector adapted to select a current message to be displayed.

42 Claims, 8 Drawing Sheets

U.S. PATENT DOCUMENTS

| | | | |
|---|---|---|---|
| 2002/0180658 A1* | 12/2002 | Saito et al. | 345/1.3 |
| 2004/0068439 A1* | 4/2004 | Elgrably | 705/14 |
| 2004/0192351 A1* | 9/2004 | Duncan | 455/456.3 |

FOREIGN PATENT DOCUMENTS

| | | | |
|---|---|---|---|
| FR | 2579810 A1 | * | 10/1986 |
| FR | 2603126 A1 | * | 2/1988 |
| GB | 2303239 A | * | 2/1997 |
| GB | 2368990 A | * | 5/2002 |

* cited by examiner

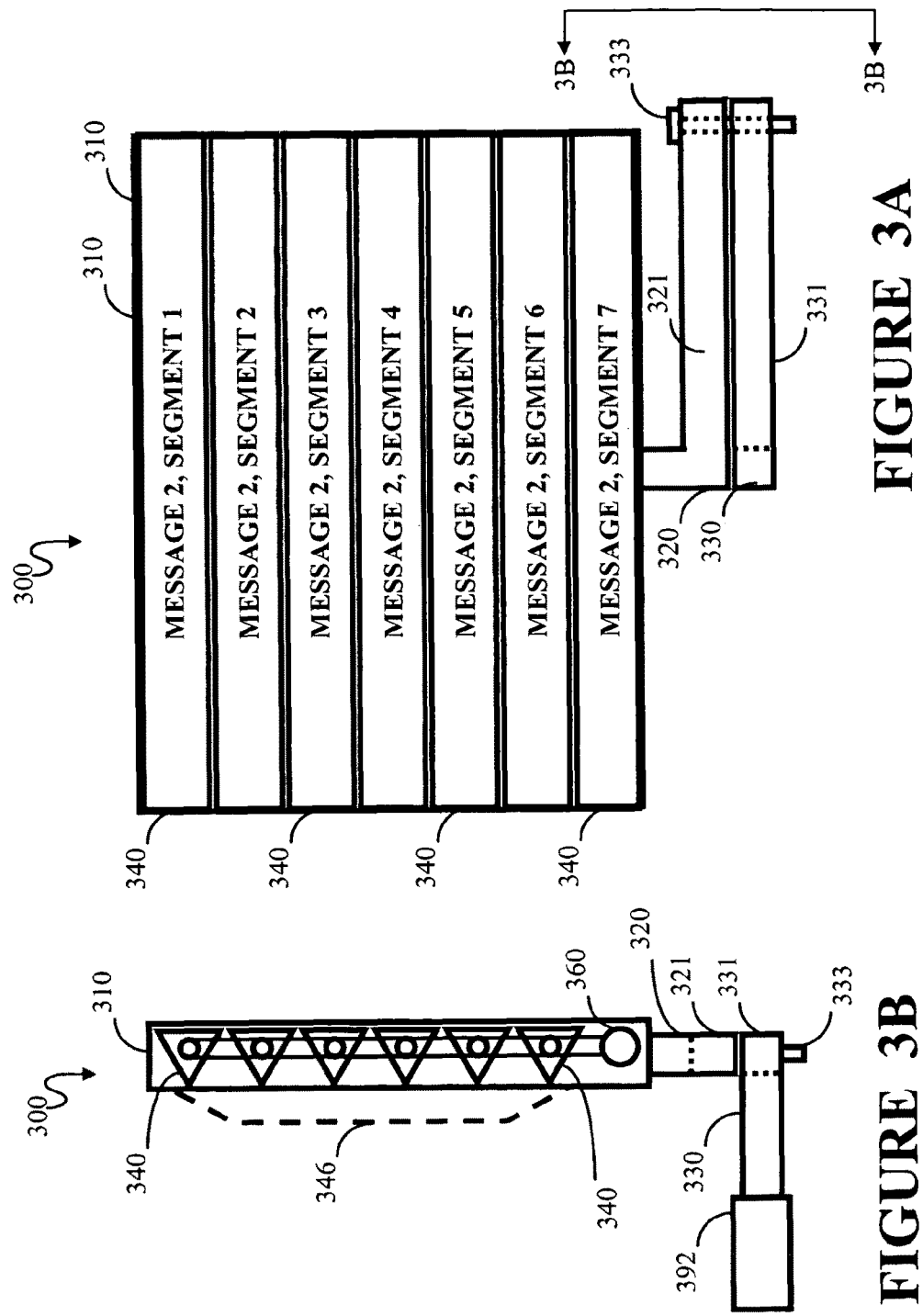

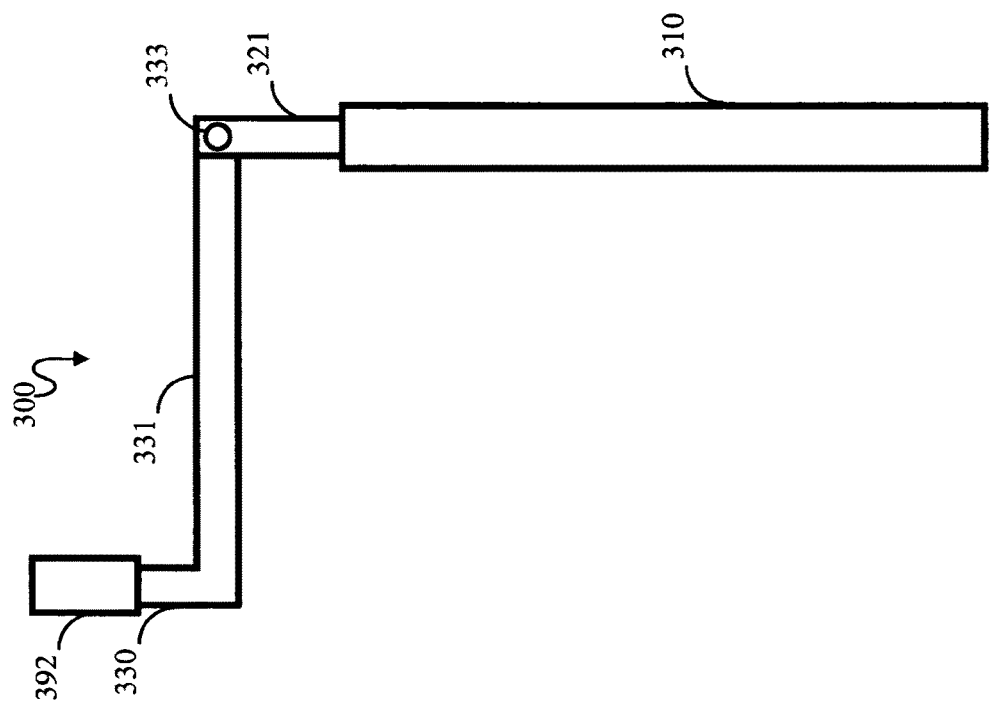

MOBILE BILLBOARD ADVERTISING SYSTEM AND APPARATUSES

FIELD OF THE INVENTION

The present invention generally relates to advertising. More particularly, the present invention relates to improvements in the distribution, placement, display and purchase of advertising messages.

DESCRIPTION OF THE RELATED ART

Roadside billboards have long been successfully used to display various advertisements. While many advertisers consider roadside billboards to be cost-effective, there are several drawbacks. For example, these advertisements are fixed at a location, so that drivers and other passersby do not generally have the opportunity to view them as long as may be needed to be effective. Further, fixed billboards are only viewable at distinct locations, further limiting the scope of their effectiveness. Yet another problem is that billboards either display only one message, or two messages using rotating panels as is known in the prior art.

In some respects, an improvement over the limitations of older prior art is to place advertising messages on the tops, sides, etc. of cars such as taxicabs, race cars, busses, trains, etc. The mobility of the vehicles to which the advertising messages are attached allows the advertising to be seen by more people than would be able to view a stationary billboard. However, the messages are typically fixed, not allowing for practical changes to advertising messages out in the field. The approach of two-sided panels provides billboards with the ability to display two distinct advertising messages. However, the advertising messages are not mobile, and therefore suffer from many shortcomings of the conventional stationary billboards.

What is desired but not provided for by the prior art, are a system and method for providing mobile advertising displays capable of being viewed by large segments of a population, and related mechanisms for displaying more than one advertising message on mobile carriers without great effort. What is further desired is a novel method of allowing advertisers to purchase advertising space on mobile displays, with the ability for flexibility in pricing, based on such factors as the location of mobile displays, time of day, day of week, projected viewership, projected motor vehicle traffic along routes likely to be driven by operators of the mobile displays, etc. Further, it is desired to create a functional pool of mobile advertising displays and incentives, so that the numbers may, if desired, far exceed the number of vehicles involved in conventional mobile advertising.

SUMMARY OF THE INVENTION

The present invention has been developed in response to the present state of the art, and in particular, in response to the problems and needs in the art that have not yet been fully solved by currently available approaches. Accordingly, the present invention has been developed to provide an advertising method that at least includes: receiving at least one advertising placement offer for the placement of an advertisement, the offer including proposed consideration; accepting an advertising placement order; and displaying an advertisement which is the subject of an accepted advertising placement order on a plurality of mobile, changeable advertising message displays carried by a plurality of coordinated automobiles, which changeable displays are capable of displaying more than one separate advertising message at different times. Each changeable advertising message display at least includes: a visual display; a multiple advertising message generator coupled to said visual display, said multiple advertising message generator adapted to generate a plurality of different advertising messages; and an advertising message selector adapted to select a current advertising message to be displayed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 3A, 3B and 3C illustrate rear, side, and top views, respectively, of a second version of the present-inventive mobile billboards;

DETAILED DESCRIPTION

Figure 1:
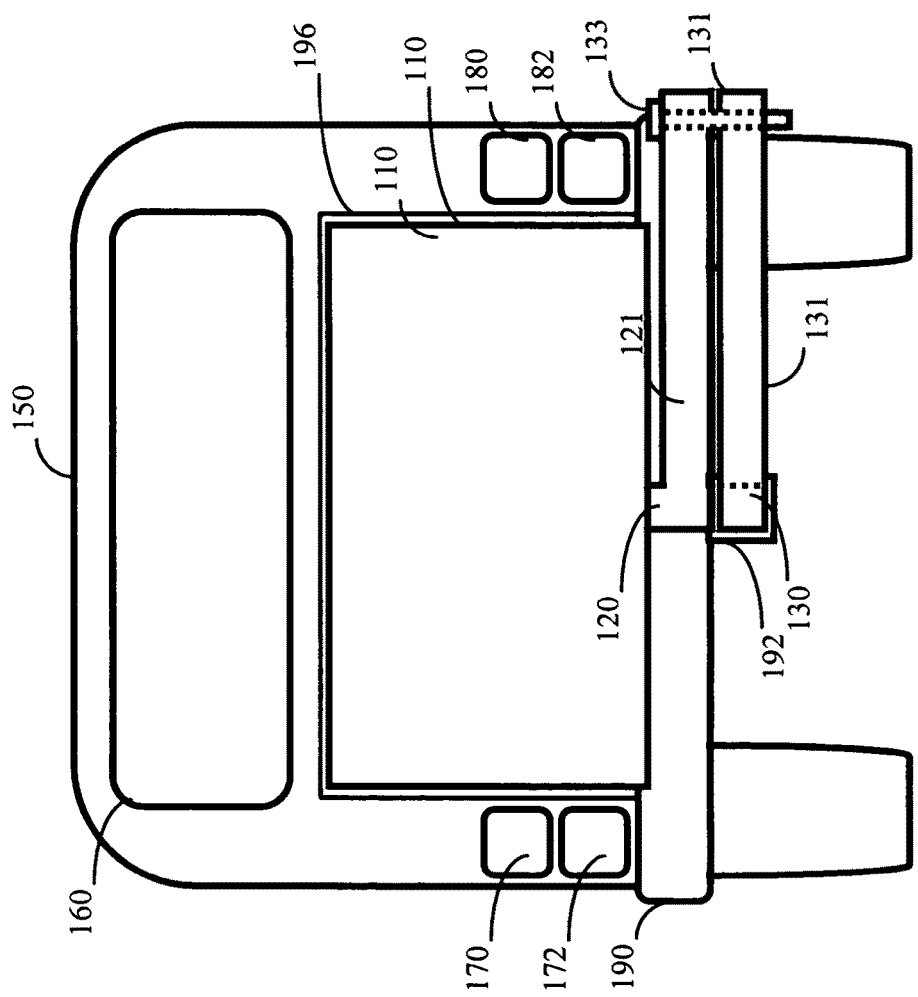
FIG. 1 illustrates a side view and a front view of a first version of the present-inventive mobile billboards shown attached to the rear of an automobile.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

References throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment.

Figure 6:
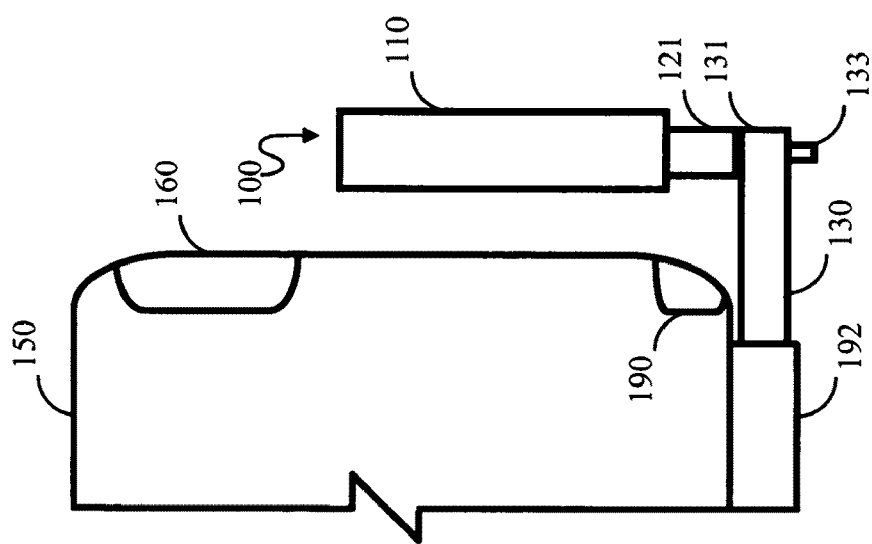
FIG. 6 illustrates a side view of the present-inventive mobile billboard and accompanying automobile of FIG. 1.

FIG. 1 shows the front view of a mobile billboard apparatus 100 according to the present invention. The apparatus mobile billboard apparatus 100 is shown mounted to the rear of an automobile 150 via a trailer hitch receiver 192. The mobile billboard apparatus need not be mounted via a trailer hitch receiver, but by any other temporary or permanent means. Further, the mobile billboard apparatus need not be mounted at the rear of an automobile, and can be attached to any suitable surface that will give the desired view to targeted viewers, including the front, hood, sides and top or the automobile. A side view of the apparatus 100 is shown in FIG. 6.

Normally, the apparatus 100 includes a display housing 110, a display carrying arm member 121, a display mounting arm member 131, and a pivot and locking member 133 which pivotally attaches the arm members 121 and 131 as shown. The display mounting arm member 131 has a trailer hitch receiver coupler 130 for insertion into the automobile trailer hitch receiver 192, while the display carrying arm member 121 has a connector 120 for connecting the display housing 110 to the carrying arm member. The mobile billboard apparatus is capable of being mounted on the rear of an automobile, and can display one or more advertising messages which can be viewed by onlookers when the automobile passes. Those skilled in the art to which the present invention pertains will understand that the mobile billboard apparatus 100 may be modified so that it need not only attach to a trailer hitch receiver, and it need not be limited to rear mounting at the rear of an automobile.

In practice, the dimensions of the display housing 110 are adapted for the prospective automobile, so that the turn and brake signals (170, 172, 180 and 182) are not obscured. The dimensions and position of the display housing are also such that viewing through the automobile rear window 160 is unobstructed.

During normal operation of the apparatus 100, the display housing 110 is placed near the automobile bumper 190. The display housing 110 can be moved away from the automobile by pulling outward on the display housing so that the arms 121 and 131 rotate and separate via the pivot 133 to provide the clearance needed to open automobile trunks, hatchbacks, doors, and other structures (symbolically shown as 196) that facilitate the loading and unloading of cargo or passengers (See FIG. 3C with respect to the second embodiment discussed below).

In one embodiment, the display 110 includes a flat panel display, such as a plasma screen or a liquid crystal display (LCD).

Figure 2:
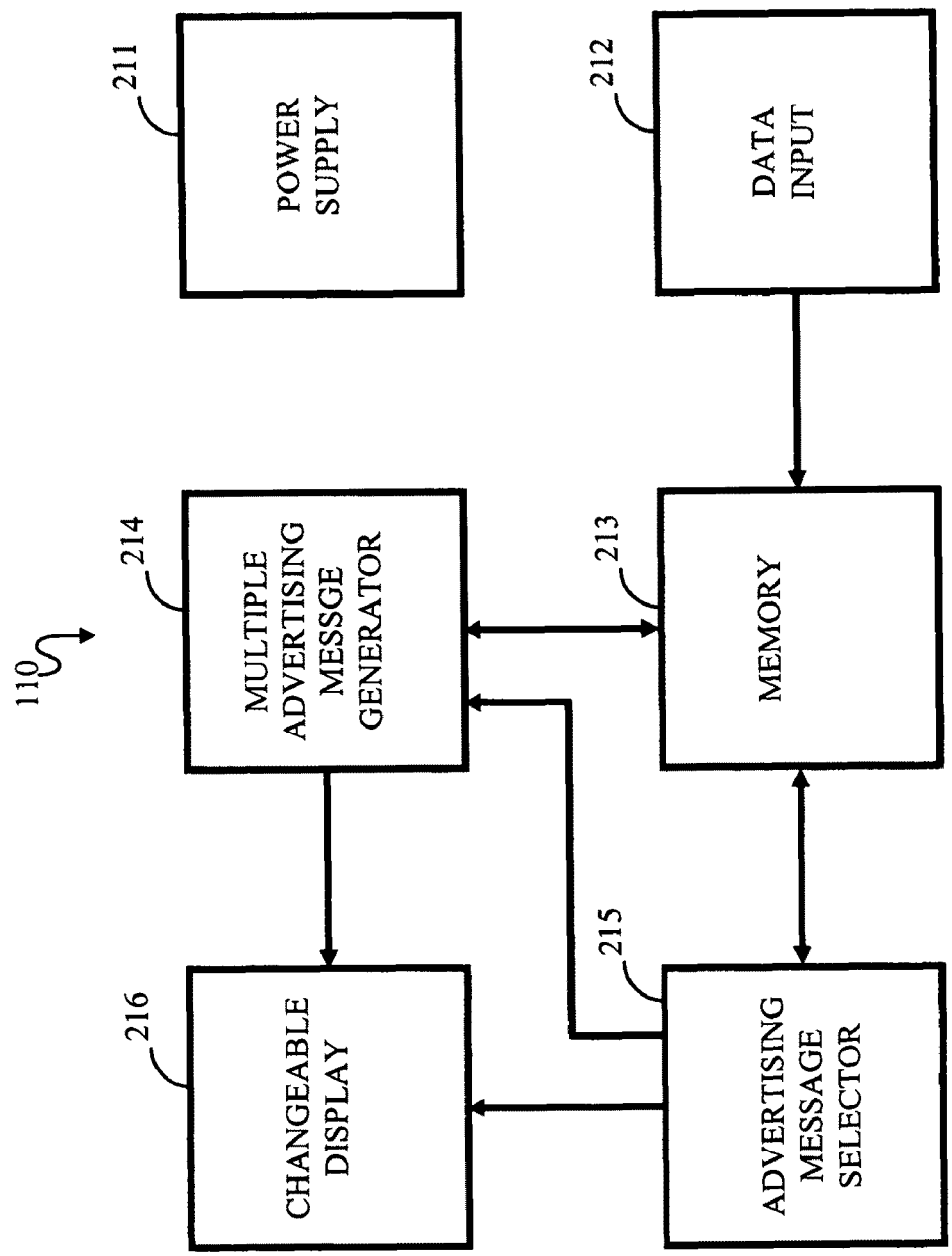
FIG. 2 illustrates a basic schematic block diagram of the display components of the mobile billboard of FIG. 1.

The basic elements of the display housing 110 are illustrated in FIG. 2. Recall that the display is a changeable one, capable of displaying several different advertising messages at different times. Symbolically labeled 216, the display (i.e., a flat panel display) displays advertising messages according to information received from a multiple advertising message generator 214. Advertising message information is stored in memory 213, with input data being received from a data input 212. The mobile billboard apparatus user can select the advertising message to be displayed via an advertising message selector 215. Similarly, the user can choose a schedule or pattern of advertising messages to be displayed at different times. All of the elements are powered by a power supply symbolically shown as 211.

Data input can take many forms, including downloading information to a common port (not shown), and reading from devices and cards, for example.

The electronic version of a mobile billboard apparatus can be replaced by a mechanical version, such as the one 300 in the rear, side and top views of FIGS. 3A, 3B and 3C, respectively. The display housing 310 contains an array of rotating prism members 340. In the preferred embodiment, the prisms have triangular bases. As a consequence, each lateral prism face can display a segment of an advertising message. Up to three different advertising messages can be displayed. To display a particular message, all of the lateral prism faces containing segments of the message in question are aligned in the plane which projects outward for viewing. To change the message, each of the prisms is rotated in synchrony until a second set of prism faces aligns projecting outward from the display housing. In the preferred embodiment, rotation and the synchronization of rotation are carried out by a mechanical linkage 350, which can be as simple as a chain or belt member that engages with the rotation members of each prism as shown. The knob 360 connected to the mechanical linkage, serves as an advertising message selector, allowing a user to rotate the prisms in unison until the desired advertising message is displayed. The prisms also cooperate to function as a multiple advertising message generator.

Using the approach of FIG. 3, the advertising message is in a printed form with discrete segments. The message segments can be affixed to the lateral prism faces by sliding the segments into transparent pockets, or by other approaches. It is also the approach of the preferred embodiment that the various segments for each advertising message are to be received by a mobile billboard user from a third party such as an advertising company.

As with FIG. 1, the display housing 310 is connected to a display carrying arm member 321 via a connector 320. The elements 330, 331, 333 and 390 function identically to the elements 130, 131, 133 and 190, respectively, as discussed supra. In the example shown, the segments of the second of three advertising messages are outwardly visible. Any necessary power to the apparatus 300 can be supplied via wires integrated into the elements 320, 321, 330 and 331, and attached to the automobile electrical supply, or supplemental supply in the alternative.

Those skilled in the art to which the present invention pertain will appreciate that the prisms 340 can contain more than three lateral faces. In fact any number of lateral faces (which match the number of sides of the prism bases) may be used. Further, the bases are polygons, but need not be regular polygons. The maximum number of advertising messages that can be display equals the number of prism lateral faces.

The prisms may be oriented in any desirable way, including vertically (not shown), horizontally (shown), and any angle between vertical and horizontal.

An optional illuminator/light source 346 can also be included within the display housing 310, or connected to the back of the display housing as shown in FIG. 3, for projecting advertising messages during nighttime and overcast viewing conditions, etc. Those skilled in the art will also appreciate that the use of the light source 346 is better accompanied by prism members with transparent lateral faces, and translucent message segments.

FIG. 3C is a top view of the mobile billboard apparatus 300, showing the display housing 310 pulled away from the automobile to provide clearance for the opening of doors, hatches, etc., as described above.

In the more general case, the prism members 340 may be described as advertising message segment mounting mechanisms. This includes such alternate embodiments as using two end mounts to connect to the ends of an advertising message segment without actually having actual separate prism lateral faces. In such an arrangement, the printed message segments form the geometric construct of prism lateral faces, with the end mounts being analogous to the prism bases. The end mounts are connected to one another by one or more column members. Middle mounts on the interior side of the message segments can also be used for additional rigidity or structural integrity of the mounted message segments.

Figure 4:
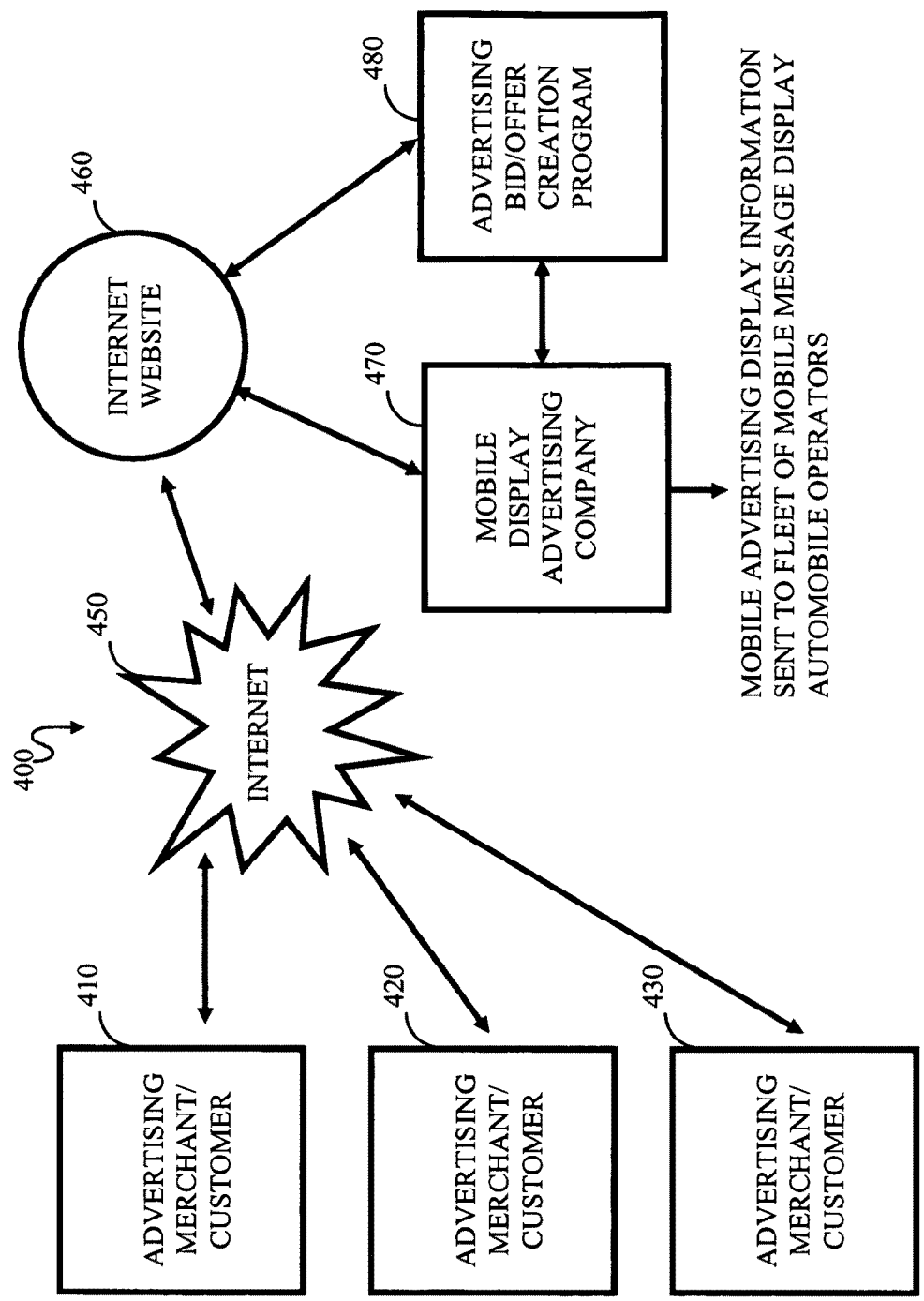
FIG. 4 illustrates a basic schematic block diagram of the present-inventive mobile billboard advertising system.

The schematic diagram for a flexible system 400 for both placing orders and bids for mobile billboard advertisement and other functions is shown in FIG. 4. While any method of contact is possible for placing orders, the Internet is used in the preferred embodiment. Merchants and others (symbolically numbered 410-430) interested in placing advertising messages on a fleet of mobile billboards can contact an advertising company 470 in the business of providing mobile billboard advertising. Contact is via the Internet 450 and a website 460 maintained by the advertising company. Special software 480 guides a customer through the process needed to place an order for mobile billboard advertising, or to make offers and bids in the alternative. When an order for mobile billboard advertising is accepted, the necessary information needed for mobile billboard automobile operators it transmitted to each appropriate operator using conventional or courier mail (in the case of apparatus of FIG. 3), digital data, and the like.

While an advertising company may accept all orders that meet explicit guidelines, it may also only accept bids and offers to maximize profits, in the case where mobile billboards are a scarce and/or valuable commodity.

Figure 5:
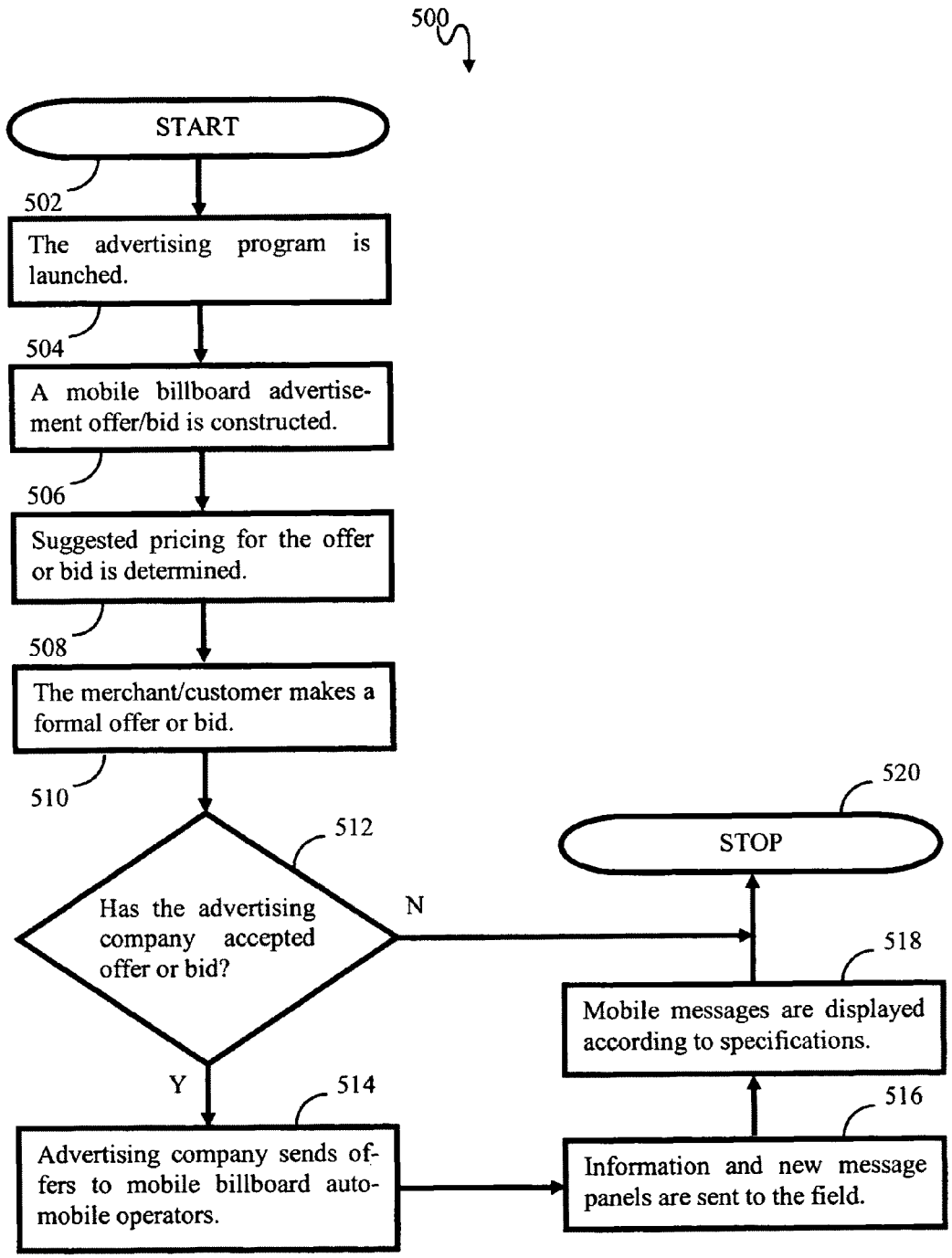
FIG. 5 illustrates a flowchart detailing the general steps in the present-inventive mobile billboard advertising method.

FIG. 5 illustrates a flowchart for a general algorithm 500 used to receive orders for mobile billboard advertising, as well as implementing said orders. The algorithm begins at Step 502 when a merchant or customer contacts the advertising company in an effort to have one or more advertising messages displayed by mobile billboards carried by a coordinated group of automobiles. The aforementioned advertising program is launched to aid the customer in preparing a bid or offer (Step 504). The bid or offer is prepared using many considerations for pricing (Steps 506 and 508). Among the many considerations for pricing are: number of automobiles carrying the particular mobile advertising message; geographic location of the mobile displays; aggregate time of the advertising message displayed; projected traffic along the paths driven by mobile message automobile operators; the time of day of the message displays; the day of the week of the message displays; aggregate distance driven by the mobile message operators; and many others.

The customer makes a formal offer for the mobile display of an advertising message in Step 510. If the advertising company rejects the offer or bid, the algorithm jumps to Step 520 and stops (See Step 512). If, however, the advertising company accepts the offer or bid, the algorithm advances to Step 514, where the advertising company sends offers for the display of advertising messages to appropriate mobile billboard automobile operators, which these operators may accept or reject according to the proposed terms. Those mobile billboard automobile operators who accept the offer receive additional information in Step 516 enabling the display of one or more advertising messages according to specifications (i.e., exact messages to display, times, locations, etc.).

Figure 7:
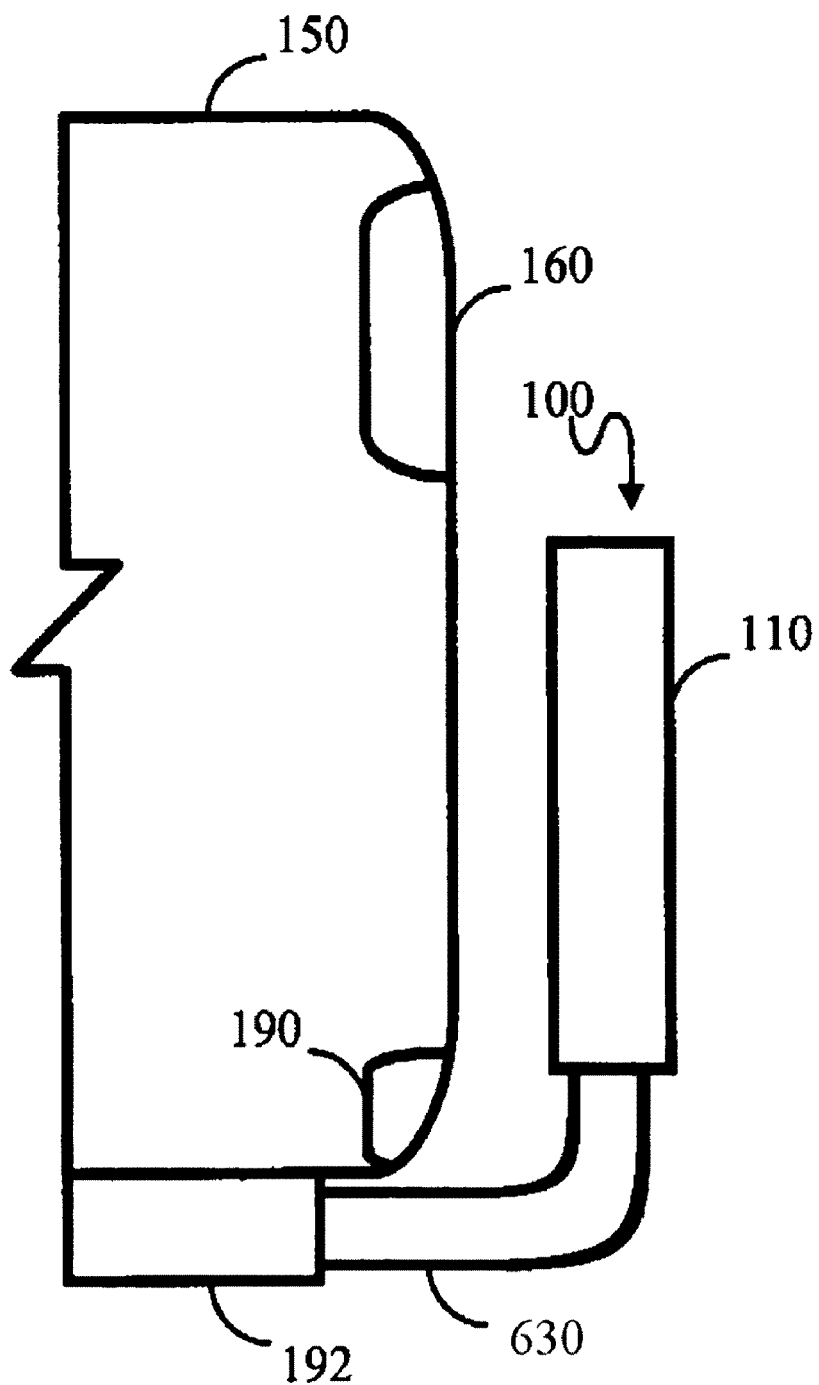
FIG. 7 illustrates an alternative mounting device for the invention illustrated in FIG. 1.

FIG. 7 illustrates an alternative mounting device for the invention illustrated in FIG. 1. Specifically, in addition to the previously described elements from the previous drawings, there is illustrated a static mounting device 630. Uniquely, the static mounting device 630 may include a single uniform piece of material that extends into the trailer hitch 192 and extends linearly outward therefrom, and thereby bends approximately 90° vertically where it attaches to the base of the display housing 110. Therefore, in contrast, this alternative static mounting device does not allow for the movement of the display housing as was previously described.

The mobile billboard automobile operators display the advertising messages according to specifications in Step 518, followed by the end of the algorithm in Step 520. The method disclosed thus provides flexibility for potential mobile billboard advertisement customers, advertising companies, as well as automobile operators carrying mobile billboards.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

It is expected that there could be numerous variations of the design of this invention.

Finally, it is envisioned that the components of the device may be constructed of a variety of materials.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method of displaying messages comprising:
    selecting a plurality of changeable message displays wherein each of the changeable message displays comprises a changeable visual display, a multiple message generator and message selector; each of the plurality of changeable message displays being attached to a respective coupling mechanism for attaching one of the changeable message display to an automobile, the coupling mechanism for each changeable message display having a pivot point disposed thereon beyond the lateral edges of that changeable message display so that pivoting the coupling mechanism moves opposing lateral edges away from the automobile when pivoted;
    removably attaching the changeable message displays to automobiles; and
    selectively pivoting the changeable message displays so that the entire changeable message displays move away from the automobiles to which they are attached to increase accessability to the automobiles.

2. The method of claim 1, wherein the changeable message display comprises:
    a plurality of juxtaposed prisms rotatable about their longitudinal axes, each lateral prism face being adapted to display a segment of a message; and
    wherein the method comprising aligning lateral faces of a plurality of prisms in a common plane to integrate segments of a message into a complete message image, and wherein more than one different message can be displayed at different times.

3. The method of claim 2, wherein said prisms each comprise three lateral faces and wherein the prisms are rotated to display one of three messages disposed on the prisms.

4. The method of claim 2, further comprising a message selector which comprises:
    a mechanical linkage connected between said prisms; and
    a rotatable selector device coupled to said mechanical linkage adapted to allow a user to rotate said rotatable selector device and transmit rotation to said prisms to move and rotate prism faces simultaneously and select an message for display; and
    wherein the method comprises the user rotating the rotatable selector device to select a desired message for display.

5. The method of claim 1, wherein said coupling mechanism further comprises:
    a carrying arm member having first and second carrying arm member ends, said first carrying arm member end coupled to said changeable message display;
    a mounting arm member having first and second mounting arm member ends, said first mounting arm member end adapted to be coupled to a hitch on an automobile;
    wherein said pivot point is comprised by connecting the second carrying arm member end and the second mounting arm member end; and
    wherein the method comprises attaching the first mounting arm member end to a hitch on a vehicle and pivoting the carrying arm member relative thereto to move the changeable message display away from the automobile end so as to allow for ingress to and egress from an automobile adjacent the first mounting arm member end.

6. The method of claim 1, wherein said changeable message display comprises a plasma display.

7. The method of claim 1, wherein said changeable message display comprises a liquid crystal display.

8. The method of claim 1, wherein the method further comprises taking and accepting at least one offer as part of a bidding process which determines the amount which a message is displayed.

9. The method of claim 8, wherein said at least one offer specifies an amount of aggregate distance over which a particular message shall be displayed by said coordinated automobiles.

10. The method of claim 8, wherein said at least one offer specifies an amount of aggregate time over which a particular message shall be displayed by said coordinated automobiles.

11. The method of claim 8, wherein said at least one offer specifies a geographic region within which a particular message shall be displayed by said coordinated automobiles.

12. The method of claim 8, wherein said at least one offer specifies a projected density of motor vehicles on roads traveled during the display of a particular message by said coordinated automobiles.

13. The method of claim 8, wherein said at least one offer specifies a projected number of message viewers during the display of a particular message by said coordinated automobiles.

14. The method of claim 1, further comprising:
    periodically selecting new messages to be displayed on the changeable message displays of said coordinated automobiles; and
    changing elements of said changeable displays accordingly.

15. The method of claim 1, further comprising:
    changing the message to be displayed based on the time of day.

16. The method of claim 1, further comprising:
    changing the advertising message to be displayed based on the particular day.

17. The method of claim 1, further comprising:
    providing remuneration to coordinated automobile operators;
    wherein each said coordinated automobile operator may accept or reject an offer to display a particular message.

18. The method according to claim 1, wherein each of the automobiles comprises a trailer hitch receiver and a rear access structure having an outer lateral edge and wherein the method comprises attaching the coupling mechanisms to the trailer hitch receivers so that the pivot point is disposed outwardly beyond the lateral edge of the structure so that when the changeable message displays are pivotable outwardly away from the automobiles beyond the outer lateral edge of the rear access structure.

19. The method according to claim 1, wherein the automobiles comprise bumpers and wherein the coupling mechanisms comprise trailer hitch receiver couplers, and wherein the method comprises engaging the trailer hitch receiver couplers in trailer hitch receivers so that the mounting arms are held behind and generally parallel to the bumpers and so that the carrying arms are pivotable between positions generally parallel to the bumpers and generally perpendicular to the bumpers.

20. A visual message display comprising:
   a changeable message display adapted to display multiple visual messages at different times;
   a carrying arm member having first and second carrying arm member ends, said first carrying arm member end coupled to said changeable message display and said second carrying arm member end extending beyond the changeable message display;
   a mounting arm member having first and second mounting arm member ends, said first mounting arm member end adapted to be coupled to an automobile;
   said second carrying arm member end and said second mounting arm member end being coupled together to provide a pivot point;
   wherein said changeable message display is movable about said pivot point from a first position adjacent to an automobile and a second position wherein the entire changeable message display is further away from the automobile than when in the first position so as to allow for ingress to and egress from an automobile while the changeable message display is coupled to the automobile; and
   wherein said billboard is operated while being transported by an automobile 21. The display of claim 20, wherein the changeable message display has a multiple message generator which comprises:
   a plurality of juxtaposed message segment mechanisms rotatable about their longitudinal axes, each message segment generator comprising:
      at least two mounts coupled by at least one column member, said mounts being adapted to connect to an message segment and display said message segment;
   wherein message segments corresponding to the same message are aligned in a plane to integrate segments of an message into a complete message image, and wherein more than one different message can be displayed at different times.

22. The display of claim 20, further comprising:
   a light source adapted to outwardly project message segments.

23. The display of claim 20, wherein the mounting arm comprises a hitch receiver coupler configured for engaging a hitch receiver disposed generally opposite the pivot.

24. The display of claim 23, wherein the hitch receiver coupler extends generally perpendicular to the remainder of the mounting arm, and wherein the carrying arm pivots between a position wherein the long axis of the carrying arm is generally perpendicular to the long axis of the mounting arm.

25. A hitch receiver mounted message display comprising:
   a changeable display configured for displaying a plurality of messages in an alternating sequence;
   a coupling mechanism for attaching the changeable display to a hitch receiver on a vehicle, the coupling mechanism being configured to hold the changeable display in a first position and a second position, said coupling mechanism further comprising a vertically oriented pivot point for allowing the changeable display to be swung away from the vehicle horizontally to increase access to the vehicle adjacent the hitch receiver.

26. The hitch mounted message display of claim 25, wherein the changeable display comprises a plurality of rotatable members, each member having a plurality of faces configured for displaying a segment of an advertisement.

27. The hitch mounted message display of claim 26, further comprising means for selectively rotating the members to selectively change the faces of the members visible outside the changeable display.

28. The hitch mounted message display of claim 25, wherein the coupling mechanism has an end attached to a hitch on an automobile and an end attached to the changeable display.

29. The hitch mounted message display of claim 28, wherein the coupling mechanism is configured to hold the changeable display above and rearward from a hitch to which the coupling mechanism is attached.

30. The hitch mounted message display of claim 28, wherein the coupling mechanism comprises a plurality of arm members.

31. The hitch mounted message display of claim 30, wherein at least two arm members of the plurality of arm members are coupled together to form the pivot point to enable the changeable display to pivot away from the hitch of a vehicle in which the coupling mechanism is disposed.

32. The display of claim 28, wherein the coupling mechanism comprises a generally L-shaped mounting arm pivotably attached to a carrying arm which is attached to the changeable display.

33. The hitch mounted message display of claim 25, further comprising means for changing the advertisement displayed in the changeable display remote from the changeable display.

34. The hitch mounted message display of claim 25, wherein
   wherein the changeable display is adjacent to the vehicle in the first position so as to prevent opening of the vehicle adjacent the changeable display;
   wherein the entire changeable display is to spaced further away from the vehicle in the second position than when in the first position so as to allow opening of the vehicle adjacent the changeable display; and
   wherein the changeable display can be moved from the first position wherein the changeable display prevents opening of a door of the vehicle to the second position when attached to the vehicle by rotation about the pivot point to allow for ingress to egress from vehicle structures.

35. A method for displaying messages, the method comprising:
   selecting a changeable message display;
   selecting a vehicle having a hitch receiver;
   connecting the changeable message display to the hitch by a coupling mechanism having a pivot point such that the changeable message display is supported by the hitch on the vehicle so that the changeable display interferes with opening a structure of the vehicle adjacent the hitch receiver, the coupling being pivotable about the pivot point so that the entire changeable message display can be swung away from the vehicle to provide access to the vehicle;
   swinging the changeable message display away from the vehicle while the coupling mechanism is still connected to the hitch receiver; and
   opening the structure of the vehicle adjacent the hitch receiver.

36. The method for displaying messages of claim 35, wherein the method comprises disposing the changeable message display behind the vehicle so that display is directed toward persons disposed behind the vehicle and wherein the changeable message display is pivotable to a position generally in alignment with a side of the vehicle so that the changeable message display is still visible.

37. The method for displaying messages of claim 36, wherein the method comprises periodically changing an advertisement shown on the changeable message display while the vehicle is moving.

38. The method for displaying messages of claim 37, wherein the method comprises selecting a changeable message display which has a plurality of members, each member have a plurality of faces containing a segment of an advertisement, and periodically rotating the plurality of members to change the faces visible outside the changeable message display to thereby change the advertisement seen by those behind the vehicle.

39. The method for displaying messages of claim 38, wherein the method comprises attaching the changeable message display to the hitch with a pivot point at or beyond a plane defined by a lateral side of the vehicle so as to enable the changeable message display to be pivoted away from the vehicle and into a position at or beyond the side of the vehicle to thereby provide access to a rear portion of the vehicle.

40. The method for displaying messages of claim 35, wherein the method further comprises removing the coupling mechanism of the changeable message display from the hitch when the changeable message display is not needed so as to remove the changeable message display from the vehicle.

41. The method for displaying message of claim 35, wherein the method comprises
disposing the changeable message display in a first position adjacent to the vehicle thereby making the advertisement visible to others; and
rotating the changeable display about the pivot point to a second position nonadjacent to the vehicle thereby providing improve access to the vehicle while maintaining the advertisement visible to others.

42. A hitch receiver mounted message display comprising:
a changeable display configured for displaying a plurality of messages in an alternating sequence; and
a coupling mechanism for attaching the changeable display to a hitch receiver on a vehicle, the coupling mechanism having a being configured to hold the changeable display in a first position adjacent the vehicle and configured to enable the changeable display to swing generally horizontally away from the vehicle to thereby provide access to the vehicle.

* * * * *